United States Patent Office 3,108,547
Patented Oct. 29, 1963

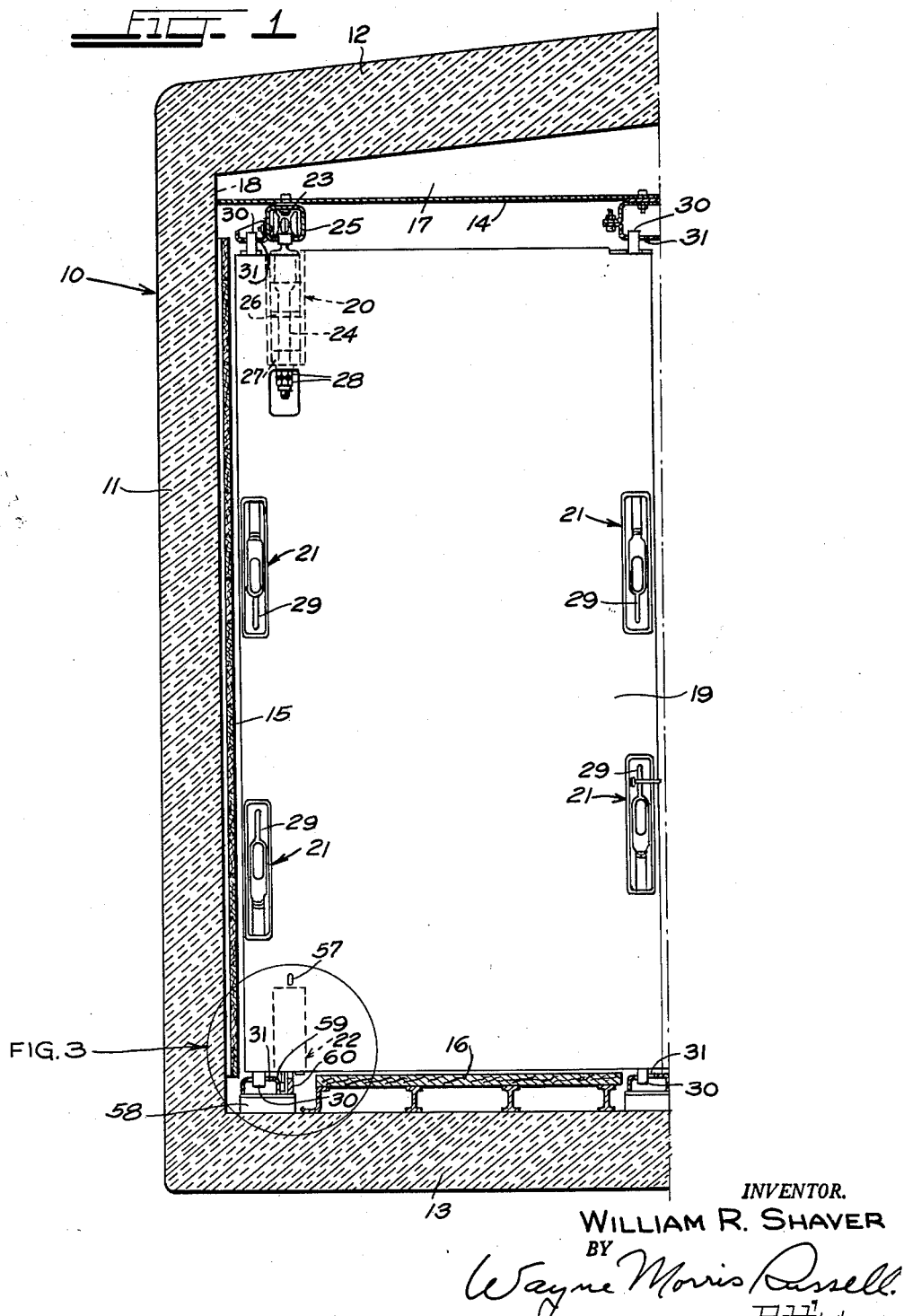

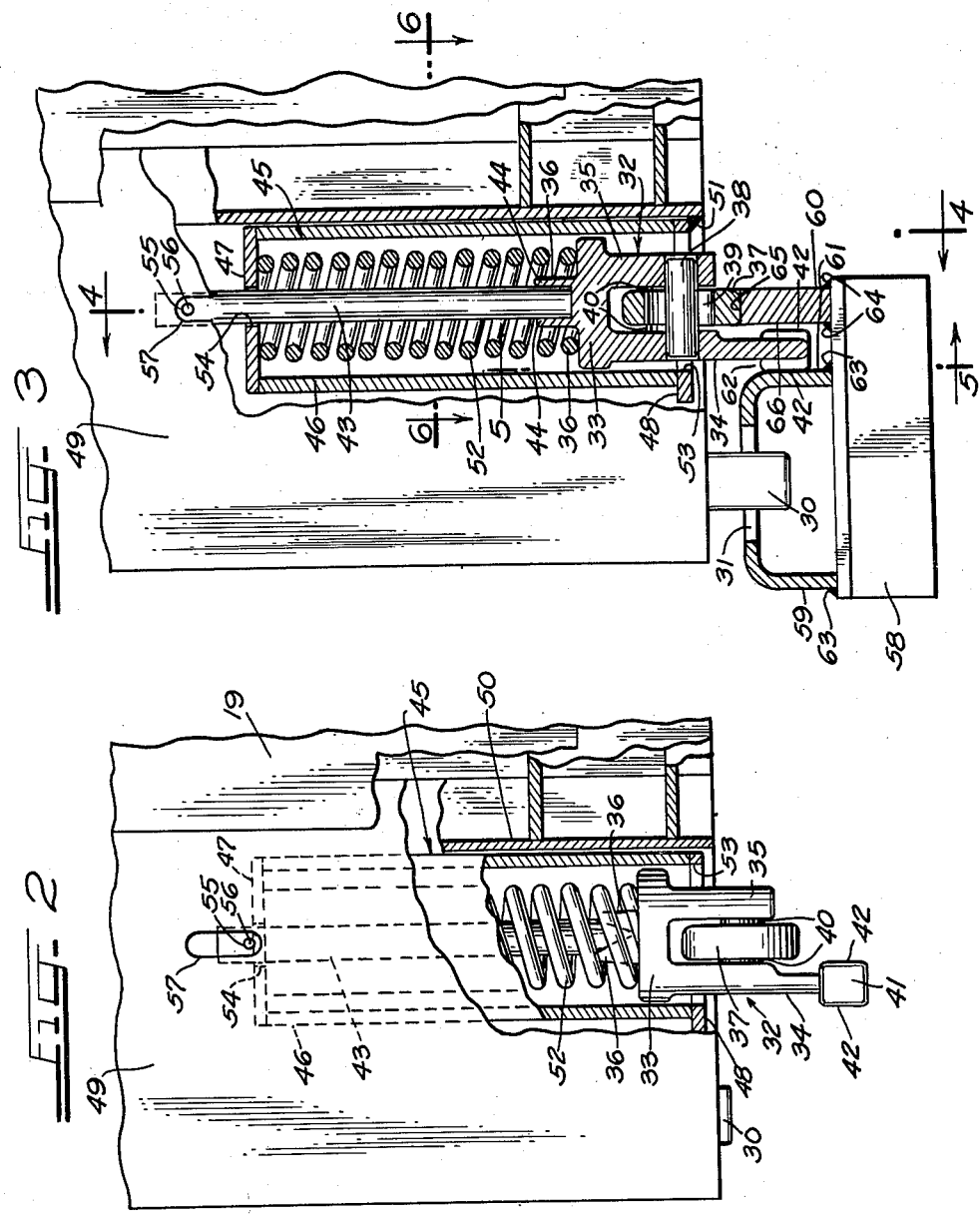

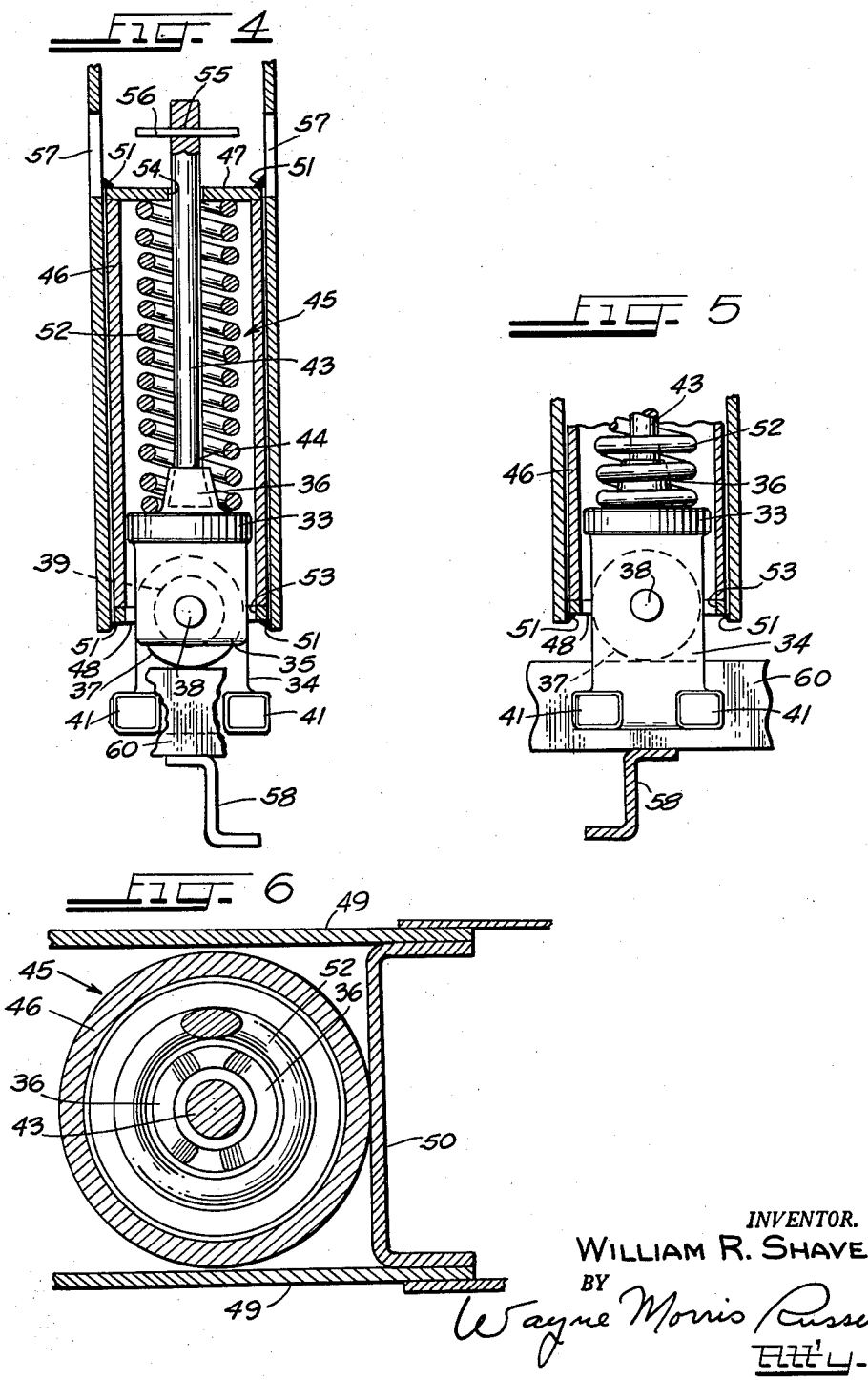

3,108,547
COMPARTMENTIZER SUPPORTING HINGE
PIVOT AND GUIDE
William R. Shaver, Hammond, Ind., assignor to Pullman Incorporated, Chicago, Ill., a corporation of Delaware
Filed Nov. 4, 1960, Ser. No. 67,286
4 Claims. (Cl. 105—376)

This invention relates to a compartmentizer supporting hinge pivot and guide arrangement adapted for use in freight vehicles more particularly for use in insulated or refrigerator type vehicles.

Compartmentizer gates have been installed in freight vehicles using arrangements which, in general, include a trolley device for each gate that is pivotally secured to the gate and movably mounted in an overhead longitudinal trackway secured to the vehicle. In these installations the trackways are fixedly secured directly to either the roof or the side structures of the vehicle, thereby providing adequate overhead supporting means for suspending the gates in the vehicle. The attachment of the trackways to the vehicle structural members of new equipment is, of course, easily made during the construction of the vehicle and attachment of the trackways to the structural members of existing conventional type box cars is also made with little or no difficulty. However, the installation of compartmentizer gates in certain existing special purpose cars, such as refrigerator cars, presents a problem in providing means for supporting the gates in the cars because of the heavy body insulation provided. The overhead trackways cannot be attached to the structural members without considerable rework of the car interior constructions which involves considerable time and expense. A feasible arrangement is to attach the overhead trackways to the existing car ceiling supporting carlines, but because generally these carlines are not of sufficient strength to support the full weight of the gates, it is necessary to provide auxiliary supporting means to support a proportionate part of the weight of the gates. This invention relates to such auxiliary supporting means located at the lower outer corner portion of each gate.

A principal object of the invention is to provide a supporting hinge pivot located at the lower outer corner portion of a compartmentizer gate which in cooperation with a suspending hinge pivot provided at the upper outer corner portion of the gate supports a proportionate part of the weight of the gate in a freight vehicle.

An important object of the invention is the provision of a vertical yielding auxiliary supporting arrangement for a compartmentizer gate which supports a proportionate part of the weight of the gate in a freight vehicle.

Another object is to provide a compartmentizer supporting hinge pivot and guide which is yieldable vertically with respect to the compartmentizer.

A further object comprehends a vertical yielding supporting hinge pivot located at the lower outer corner portion of a compartmentizer gate in vertical alignment with a suspending hinge pivot located at the upper outer corner portion to provide hinging means for swinging the gate horizontally in a freight vehicle.

A still further object contemplates a compartmentizer supporting hinge pivot and guide that is yieldable vertically with respect to the compartmentizer and includes a roller which when the compartmentizer is installed in a vehicle is movably mounted on a longitudinally disposed supporting rail member secured to the vehicle at its floor line.

Still another object is to provide a compartmentizer supporting hinge pivot and guide arrangement wherein the guide portion extends downwardly below the lower edge of the gate and when the gate is installed in a vehicle the guide portion extends into a longitudinally disposed guide way provided at the vehicle floor line.

And still another object is the provision of a supporting hinge pivot and guide arrangement for a compartmentizer gate which when the gate is installed in a freight vehicle cooperates with a suspending hinge pivot and guide arrangement to distribute the weight of the gate so that each arrangement supports a proportionate part thereof and provides hinging means for swinging the gate horizontally and guiding means for directing the gate during longitudinal movements in the vehicle.

The foregoing and other objects of the invention are attained by the construction and arrangement illustrated in the accompanying drawings wherein FIG. 1 is a transverse vertical sectional view through one-half the body of a railway refrigerator freight car showing a compartmentizer gate in transverse position in the car including the supporting hinge pivot and guide arrangement of this invention;

FIG. 2 is a fragmentary elevational view of the lower outer corner portion of the compartmentizer gate in FIG. 1 before installation in the car and having portions of the gate structure removed showing the supporting hinge pivot and guide arrangement to a larger scale;

FIG. 3 is the same as FIG. 2 except showing the gate installed in the car;

FIG. 4 is a vertical sectional view taken on line 4—4 in FIG. 3;

FIG. 5 is a vertical sectional view taken on line 5—5 also in FIG. 3; and

FIG. 6 is a horizontal sectional view taken on line 6—6, likewise in FIG. 3.

This invention provides a compartmentizer supporting hinge pivot and guide arrangement for use at the lower outer corner portion of a compartmentizer gate having a suspending hinge pivot and guide arrangement at its upper outer corner portion. The hinge pivot of the inventive supporting arrangement is disposed in vertical alignment with the hinge pivot of the suspending arrangement to provide hinging means for swinging the gate horizontally in a freight vehicle. The supporting arrangement includes a bottom roller pivotally mounted to the supporting hinge pivot which is yieldable vertically with respect to the gate. When the gate is installed in a vehicle, the roller is movably mounted on a longitudinally disposed supporting rail secured to the vehicle at the vehicle floor. The yieldability of the supporting arrangement distributes the weight of the gate so that the supporting hinge pivot and the suspending hinge pivot each support a proportionate part. The guiding portion of the supporting arrangement extends below the bottom roller into a guide way provided in the vehicle floor adjacent the roller supporting rail member whereby the supporting hinge pivot is prevented from turning with respect to the vehicle and the gate is directed during longitudinal movements in the vehicle.

As noted above, FIG. 1 of the drawings is a transverse sectional view through one-half the body of a railway refrigerator freight car. A compartmentizer gate 19 is shown installed and positioned transversely of the car. The devices necessary for the operation of the gate are indicated, including a suspending hinge pivot and guide arrangement 20, locks 21 and the supporting hinge pivot and guide arrangement 22 of this invention. The foregoing referring to gate 19 only as applied on one side of the car is deemed sufficient to cover both gates of a mating pair applied on respectively opposite sides of the car since the application of each gate is identical, except for the reverse positioning of certain details. The invention, then, as hereinafter described as pertaining to gate 19, is intended to apply to both gates of a mating pair.

In the drawings 10 represents a railway refrigerator freight car which is heavily insulated at its side walls 11, roof 12 and floor 13. The car, being generally conventional type, is equipped with the usual type of electro-mechanical refrigeration equipment and is arranged so that the conditioned air for refrigerating the car is discharged from the equipment compartment into air spaces which form an air duct system completely surrounding the refrigerator portion of the car. The spaces forming the air duct system include a space above the ceiling 14, a space behind each side wall lining 15 and a space below the floor racks 16. A plurality of transversely disposed carlines 17 are provided at longitudinally spaced intervals and support the car ceiling 14. Each carline is secured at its ends 18 to the side wall structures of the car.

While there are a number of suspending hinge pivot and guide arrangements that can be used with the invention, the arrangement 20 as indicated represents a preferred form. It may be described as generally comprising a trolley 23 having a vertical depending pivot arm 24. Trolley 23 is movably mounted in trackway 25 which is disposed longitudinally of the car and secured to carlines 17. Trackway 25 extends continuously substantially the full length of the car which allows uninterrupted movement of trolley 23 from one end wall of the car to the other, including the spaces extending across the car side door openings. Hinge pivot arm 24 is pivotally secured to gate 19 at its upper outer corner portion by means of guiding 26 and supporting 27 members provided in the gate. Pivot arm 24 passes through vertically aligned holes provided in the guiding and supporting members 26 and 27 and has a lower end portion extending below the bottom surface of supporting member 27. Fasteners 28 are applied over the lower end portion of pivot arm 24, thereby providing a suspending hinge pivot which supports the gate in the car. By means of hinge pivot 24, gate 19 may be swung horizontally in the car in either direction from a position transversely of the car to a position parallel to the side wall of the car and at the side door openings of the car the gate may be swung to an outwardly directed position wherein the gate extends through the side door opening. By means of trolley 23, gate 19 may be moved longitudinally to various locations in the car and is directed during these movements by trackway 25 which, in addition to providing supporting means in the car, also serves to guide the trolley when it is moving in the trackway.

Locks 21 as shown in FIG. 1 provide a locking arrangement for securing gate 19 in position transversely of the car at any of a plurality of selective locations lengthwise of the car. These locks are not a part of the invention but are included in the drawing to indicate how they can be used to provide a locking arrangement for use with the inventive device 22. Other forms of locking arrangements may be used with the invention. Locks 21 may then be described generally as being individual slide bolt type, each manually operated by means of an operating handle 29 which is moved either upwardly or downwardly to operate slide bolt 30 to locked or unlocked position. In one operation of handle 29 slide bolt 30 is moved to its extended position to engage a keeper slot 31 which locks the gate in position. In the opposite operation of the handle, the slide bolt is retracted, disengaging it from the keeper slot to unlock the gate. A plurality of slots 31 is provided at longitudinally spaced intervals in each of the keeper members secured to the car at each location of slide bolts 30. The spaced intervals of keeper slots 31 in each of the keeper members are equal and in vertical plane alignment with each other to provide the plurality of longitudinal selective locations at which the gate may be positioned transversely in the car.

As best shown in FIGS. 2 and 3, the supporting hinge pivot and guide arrangement 22 includes a pivot assembly 32 having a lower unit comprising a horizontal spring seat portion 33, two downwardly extending roller pivot supporting flanges 34 and 35 and upwardly extending pivot rod connecting flanges 36. Flanges 34 and 35 are spaced apart and support a vertical roller 37 by means of pivot pin 38. Roller 37 is pivotally mounted on pin 38 by means of roller bearing 39 which permits free rotation of the roller on the pin. A spacer washer 40 is provided on each side of roller 37 between the roller and adjacent flanges 34 and 35. Flange 34 extends below the bottom edge of roller 37 and is provided with lugs 41, one on each side, along its lower edge. Lugs 41 extend outwardly from the width of the main portion of flange 34 and are thicker than the main portion of the flange to provide guiding surfaces 42 on each side of the lugs. Flanges 36 are circular shape, when viewing them from above, to form a pocket into which the lower end of circular pivot rod 43 is inserted and secured thereto by means of welding as at 44 or by other suitable means. Pivot rod 43 extends upwardly from flanges 36 to provide guiding means for pivot assembly 32 and a helical compression spring as will later be described.

Supporting hinge pivot and guide arrangement 22 also includes a hinge pivot housing unit 45 which comprises a vertically disposed circular section tube member 46 having horizontal top and bottom plates 47 and 48 secured to its top and bottom edges respectively. As shown in FIG. 6, the structure of gate 19 contemplates a double plate construction having outer plates 49 spaced apart with stiffener members between the plates as indicated by channel 50. As indicated, housing 45 is located in the lower outer corner portion of the gate between plates 49 and is positioned therein so that supporting hinge pivot 32 is in vertical alignment with suspending hinge pivot 24. The housing is secured to the gate structure by means of welding, as shown at 51.

Helical compression spring 52 is applied over pivot rod 43 and the spring, together with pivot assembly 32, is inserted into housing 45 from the bottom of the housing by means of a circular hole 53 provided in bottom plate 48. The diameter of hole 53 is the same as the inside diameter of tube 46 thereby allowing the spring and pivot assembly to pass through it. Pivot rod 43 extending through a circular hole 54 provided in top plate 47 has an upper portion extending above the top surface of plate 47. Circular hole 55 is provided in pivot rod 43 for the application of locking pin 56 which application is made after the pivot assembly and spring are in place in the pivot housing. Application of pin 56 is made by means of oblong access holes 57, one of which is provided in each outer plate 49 of the gate structure. Pin 56, being self-locking type, retains its position in hole 55 after being applied therein. The end portions of pin 56 extend beyond hole 55 on each side of rod 43, as shown in FIG. 4. The end portions of pin 56 contact the top surface of plate 47 to prevent pivot assembly 32 and spring 52 from falling out of housing 45 during the assembly of the gate and before its installation in the car as best shown in FIGS. 2 and 4.

Reference is now made to FIG. 3 which shows the lower outer corner portion of gate 19 including the supporting arrangement 22 when the gate is installed in the car. A plurality of transversely disposed supporting clips 58 is provided adjacent each side wall of the car. These clips are supported by and secured to the underframe members of the car structure at longitudinally spaced intervals extending substantially for the full length of the car. Clips 58 support locking bar keeper member 59 and roller supporting rail member 60 each of which, being longitudinally disposed, extends continuously substantially from one end wall of the car to the other. Keeper slots 31 for engagement with slide bolt 30 are provided in keeper member 59 as hereinbefore described. Rail member 60 is spaced inwardly from the inwardly facing vertical surface 61 of keeper member 59 to provide a longitudinal guide way 62 extending continuously substantially for the full length of the car interior including the spaces extending across the car side door openings. Keeper member 59 and rail member 60 are secured to clips 58 by means of welding, as shown at 63 for the keeper member and 64 for the rail member. Roller 39 is supported by rail member 60, its upwardly facing surface 65 being in supporting contact with the outer surface of the roller. Flange 34 of pivot assembly 32 extends downwardly into guide way 62 so that the guiding surfaces 42 of lugs 41 are each in sliding contact with adjacent vertical surfaces 61 and 66 of the guide way respectively.

Pivot housing 45 is an integral part of gate 19 by reason of its welded attachment to the gate. In addition to its function as a housing for pivot assembly 32 and spring 52 it serves as a supporting member when the gate is installed in the car. The load, due to the weight of the gate, is transmitted from housing 45 to pivot assembly 32 by means of compression spring 52 which is placed between plate 47 of the housing and spring seat 33 of the pivot assembly. Roller 37 being a part of pivot assembly 32 by reason of its pivotal connection to pin 38, which has its respective end portions secured to flanges 34 and 35 of the pivot assembly, transmits the load to the upwardly facing surface 65 of rail member 60. Compression spring 52 is applied to the gate at approximately its free height position, as shown in FIG. 2. When the gate is installed in the car, the spring is compressed to support a proportionate part of the weight of the gate, as shown in FIGS. 3 and 4. From the foregoing, it can be seen that the inventive supporting hinge pivot distributes the weight of the gate so that the suspending hinge pivot 24 is required to support only a proportionate part. Thus with this reduction of the load to be supported by hinge pivot 24, a comparative reduction can be made in the car supporting means and carlines 17 are, therefore, adequate to support trackway 25.

The guiding surfaces 42 of flange 34, being in sliding contact with vertical surfaces 61 and 66 of guide way 62, prevent pivot assembly 32 from turning with respect to the car, thereby providing a hinge pivot about which the gate may be swung. This hinge pivot being in vertical alignment and operating with suspending hinge pivot 24 provides hinging means for swinging the gate horizontally in the car. Surfaces 42 are guided by surfaces 61 and 66 of guide way 62 during longitudinal movements of the gate in the car. These surfaces also direct roller 37 during rotary movements to keep it in longitudinal alignment with surface 65 of rail member 60. Guide way 62 extending continuously allows uninterrupted movement of lugs 41 from one end wall of the car to the other, including the spaces extending across the car side door openings. It can be seen that the wheels of trolley 23 which are movably mounted in trackway 25 and roller 37 which is movably mounted on rail member 60 provides for easy longitudinal movements of the gate in the car and that spring 52 makes roller 37 yieldable to compensate for any slight unevenness that might be present in contact surface 65 of rail member 60.

From the foregoing it will be seen that the invention provides a compartmentizer supporting hinge pivot and guide located at the lower outer corner portion of a compartmentizer gate which when used in a gate having a suspending hinge pivot and guide located at its upper outer corner portion cooperates with the suspending hinge pivot and guide to distribute the weight of the gate installed in a freight vehicle so that each hinge pivot supports a proportionate part of the weight and provides hinging means for swinging the gate horizontally and guiding means for directing the gate during longitudinal movements in the vehicle.

What is claimed is:

1. In a freight vehicle having an interior side wall, floor and ceiling,
    a compartmentizer gate provided therein and apparatus for pivotally mounting said gate in said vehicle adjacent said side wall,
    said apparatus comprising upper suspending means suspending said gate from said ceiling adjacent the upper edge of said gate and lower supporting means engageable with said floor and supporting said gate therefrom adjacent the lower edge of said gate,
    said lower supporting means including a supporting element fixedly secured to the lower portion of said gate, a lower bearing element movably engaging the floor of the vehicle and connected to said supporting element for pivotal movement about a vertical axis, and spring means compressively interposed between said lower bearing element and said supporting element and being thereby operative to transmit to said lower bearing element a portion at least of the weight of said gate,
    and said upper suspending means including a suspending element fixedly secured to the upper portion of said gate and having a lower bearing surface, a trolley mounted for movement longitudinally along the ceiling of the vehicle, a pivot arm depending from said trolley and having a vertical pivot axis aligned with said pivot axis of said lower bearing element of said lower supporting means, and upper bearing means operatively connecting said arm to said suspending element and having an upper surface engaged with said lower bearing surface of said suspending element and being thereby operative to support the remainder of the weight of said gate.

2. The combination claimed in claim 1 in which said floor has a rail member in fixed relation therewith extending longitudinally of the vehicle and the lower bearing element of the lower supporting means comprises a roller running on said rail member.

3. The combination claimed in claim 1 in which said floor has a rail member fixed in relation therewith extending longitudinally of the vehicle and providing top and side surfaces and the lower bearing element of the lower supporting means includes a roller running on said top surface of the rail member and has a downward extension providing a guide surface engaged with the side surface of said rail member.

4. The combination claimed in claim 1 in which said lower supporting element includes a housing member comprising a vertically disposed circular tube fixedly secured to the lower portion of said gate and said lower bearing element includes an upper portion of cylindrical shape disposed within said tube for rotation therein and having a top surface providing a seat for said spring means.

References Cited in the file of this patent

UNITED STATES PATENTS

| 2,052,089 | Fairhurst | Aug. 25, 1936 |
| 2,517,823 | Angell | Aug. 8, 1950 |
| 2,752,864 | McDougal et al. | July 3, 1956 |
| 2,911,925 | Adler et al. | Nov. 10, 1959 |
| 3,005,419 | Loomis et al. | Oct. 24, 1961 |
| 3,018,741 | Loomis et al. | Jan. 30, 1962 |